United States Patent
Bushart et al.

(10) Patent No.: US 8,097,164 B2
(45) Date of Patent: Jan. 17, 2012

(54) PROCESS FOR PREPARING MAGNETIC PARTICLES FOR SELECTIVELY REMOVING CONTAMINANTS FROM SOLUTION

(75) Inventors: Sean Paul Bushart, Corte Madera, CA (US); David Bradbury, Glos (GB); George Elder, Glos (GB); Ilona Pascual, Sevilla (ES)

(73) Assignee: Electric Power Research Institute, Inc., Palo Alto, CA (US)

( * ) Notice: Subject to any disclaimer, the term of this patent is extended or adjusted under 35 U.S.C. 154(b) by 791 days.

(21) Appl. No.: 12/212,206

(22) Filed: Sep. 17, 2008

(65) Prior Publication Data
US 2009/0120880 A1  May 14, 2009

Related U.S. Application Data

(60) Provisional application No. 61/002,303, filed on Nov. 8, 2007.

(51) Int. Cl.
*G21F 9/00* (2006.01)
*B01J 45/00* (2006.01)
*B01D 35/06* (2006.01)

(52) U.S. Cl. ........ 210/670; 210/660; 210/682; 210/695; 588/1; 376/310; 423/6

(58) Field of Classification Search .............. 210/660, 210/670, 682, 695; 588/1; 376/310; 423/6
See application file for complete search history.

(56) References Cited

U.S. PATENT DOCUMENTS

| | | | |
|---|---|---|---|
| 5,397,476 A | 3/1995 | Bradbury et al. | |
| 5,491,219 A | 2/1996 | Mann et al. | |
| 5,652,190 A | 7/1997 | Kochen et al. | |
| 5,790,964 A | 8/1998 | Pourfarzaneh et al. | |
| 5,852,786 A | 12/1998 | Bradbury et al. | |
| 5,855,790 A | 1/1999 | Bradbury et al. | |
| 6,117,413 A | 9/2000 | Fisher et al. | |
| 6,232,353 B1 | 5/2001 | Alexandratos et al. | |
| 6,488,859 B2 | 12/2002 | Alexandratos et al. | |
| 6,630,114 B1 | 10/2003 | Dozol et al. | |
| 6,972,095 B1 | 12/2005 | Bushart et al. | |

FOREIGN PATENT DOCUMENTS

| | | |
|---|---|---|
| EP | 0 522 856 A1 | 1/1993 |
| EP | 0 666 577 B1 | 8/1994 |
| WO | WO 02/13202 | 2/2002 |

OTHER PUBLICATIONS

Dasaradhi, L., et al.; "4-*tert*-Butylcalix[4]arene Tetrahydroxamate Chelators for the Selective Extraction of Actinide Ions: Synthesis and Preliminary Metal Ion Extraction Studies"; J. Chem. Soc., Perkin Trans. 2, 1997.

(Continued)

*Primary Examiner* — David A Reifsnyder
(74) *Attorney, Agent, or Firm* — Curatolo Sidoti Co., LPA; Joseph G. Curatolo; Salvatore A. Sidoti (57) ABSTRACT

A process for selectively removing contaminant ions from a solution includes:
a) contacting the solution with magnetic particles coupled to selectively chelating ion exchange functionality containing moieties prepared by:
  i) activating carboxyl groups on the selectively chelating ion exchange functionality containing moieties by the formation of an acyl fluoride, and
  ii) reacting the acyl fluoride with the magnetic particles, the magnetic particles having a particle size of less than 10 microns;
b) allowing the chelating functionality coupled magnetic particles to selectively bind one or more of the contaminant ions; and,
c) extracting the chelating functionality coupled magnetic particles and contaminant ions from the solution by magnetic filtration.

19 Claims, 5 Drawing Sheets

Synthesis of acyl fluoride

OTHER PUBLICATIONS

Eichrom Industries Inc.; "Novel Silica-Based Ion Exchange Resin"; Work Performed Under Contract No. DE-AR21-96MC33088 for U.S. Dept. of Energy, Final Report 1997.

Ludwig, R., et al.; "Solvent Extraction of Lanthanides and Actinides by Calix(6)arenes Bearing Carboxylic Acid Groups"; Institute for Inorg. and Analyt. Chem., Radiological Div., Freie Universität Berlin, Fabeckstr. 34-36, 14195 Berlin, Germany; downloaded from internet on Oct. 4, 2007.

Nuñez, L., et al.; "Waste Remediation Using In Situ Magnetically Assisted Chemical Separation"; Separation Science and Technology, vol. 30, Issue 7—Apr. 9, 1995 , pp. 1455-1471.

"European Search Report for Corresponding EP 08075793.3-2208", Apr. 27, 2009.

Fig. 1 Calix[4]arene structure

Fig. 2
1,3-Calix[4]arene crown-6

Fig. 3

4-1,3 Calix[4]biscrown-6     1,3 Calix[4]bis-o-naptho-crown-6

Fig. 4 Substitution of one crown ether by pendant alkyl chains

Fig. 5 Synthesis of 25,27-bis[(4-carboxybutyl)oxy]calix[4]arene-crown-6

Fig. 6 Activation of carboxyl groups

Fig. 7 Synthesis of acyl fluoride

PROCESS FOR PREPARING MAGNETIC PARTICLES FOR SELECTIVELY REMOVING CONTAMINANTS FROM SOLUTION

CROSS REFERENCE TO RELATED APPLICATIONS

This Application claims the benefit of the filing date under 35 U.S.C. §119(e) of U.S. Provisional Application for Patent Ser. No. 61/002,303, filed Nov. 8, 2007, which is incorporated herein by reference.

BACKGROUND

There are many well developed techniques for the bulk removal of dissolved impurities from water solution. Some typical examples are evaporation, ion exchange and reverse osmosis. These techniques are generally less well suited to selectively removing certain particular impurities while leaving the remainder of the dissolved constituents in solution. However, selective removal of minor contaminant ions from solution is a very common requirement for many applications, particularly when processing radioactive effluents from nuclear power plants and other facilities. In this case the removed contaminants require careful containment or disposal as radioactive waste, and the volume of such waste must be rigorously minimized for economic and other reasons. If harmless dissolved species are removed concomitantly with the radioactive contaminants, the resulting waste volume will be uneconomically large. Effluents usually contain radioactive species in very low molar concentration (typically about $10^{-15}$ to $10^{-12}$ moles per liter) and the chemistry of the radioactive ions is usually distinctly different from other harmless dissolved species present in greater concentration. This permits the design of specific removal methods to target the radioactive ions only.

The most typical way of removing contaminants from solution is to transfer the contaminants to a different phase, normally from liquid to solid. If the radioactive ions bind onto particles added to the solution, the particles can be removed by solid liquid separation techniques. There are many examples of selective solid absorbers which remove radioactive ions, including industrial scale applications such as the use of clinoptilolite for the selective removal of cesium and strontium from effluents from the Sellafield plant in the UK.

There are, however, problems to be overcome in designing a selective radioactive ion removal process as described above. In order to have adequate capacity to hold the contaminants, the particles must either be porous (so that the absorption functionality is distributed throughout the volume of the particle) or they must be very small. Robust porous particles, (like clinoptilolite above), are difficult to create and usually, like clinoptilolite, have limited selectivity of absorption. More choice of selective absorbers is available with small particles, which may also have the potential benefit of rapid absorption kinetics (which may be very important in designing a practical process plant). However, small particles are difficult to separate from solution by solid liquid separation techniques. This final difficulty may be overcome by creating special small magnetic particles, which can be separated from solution by magnetic filtration. If the particles are made highly selective for contaminant removal, only small quantities of the particles will be required, thereby allowing various separation protocols within normal economic constraints.

The general principle of selective removal of radioactivity by magnetic particles was previously explored wherein the particles were built up by surrounding magnetic cores (of magnetite, for example) with an organic polymer onto which could be attached selective ion exchange functions, or other particles of selective ion exchangers could be embedded in the forming polymer. As a consequence of the production methodology, (that is, using solid magnetic particles as the core and emulsion polymerization methods), the particles had a diameter of about 10 to about 100 microns, and it is not possible to reduce this significantly. At the time of this earlier work, another reason for the large particle diameter was that the particles had to have a core size sufficient for the magnetic forces acting on the particle to cause efficient migration of the particles through the liquid. Since that time magnetic filtration technology has improved considerably, and much smaller particles can now be efficiently filtered from solution.

Because of the relatively large particle diameter, the ion exchange capacity was small. The ion exchange functionality was only present on the surface of these particles, not throughout their volume. To overcome this the absorption on the particles was usually made reversible, so that the contaminant could be removed from the absorber and the absorber reused. However, the requirement for reversibility of the absorption reaction placed limitations on the choice of the selective absorber used, and limited the selectivity achievable for any specific contaminant. The capacity limitation therefore restricted the usefulness of the concept to a few special applications.

In a totally different field of science developments have been taking place in the production of small magnetic particles. The need for ever more compact information storage systems has led to production of uniform magnetic particles of diameters of the order of 10 nanometers (0.01 microns). The intricacy of biological systems has been harnessed to this purpose. In the biological systems, iron is required for uses such as hemoglobin production and is typically stored in protein conglomerates called "ferritins". These naturally synthesized protein conglomerates have the desired dimensions and have a central cavity which accumulates iron in the form of oxide/hydroxide. Furthermore the iron can be removed and replaced from the cavity either under natural conditions, or under laboratory control. The natural iron can also be replaced with intensely ferromagnetic materials, thereby improving information storage properties or, for the present purposes, aiding the subsequent magnetic filtration. The removal of these non-functionalized enhanced magnetic ferritins (magnetoferritins) from water solution has been demonstrated using modern magnetic filtration methods.

DESCRIPTION

The subject process uses magnetic particles that are very small magnetic species which have selective ion exchange functionalities attached to their surface. These functionalities, also referred to as functions, bond to specific contaminant ions dissolved in a solution.

The ion exchange functions have highly selective properties which can capture specific contaminant ions which are in low concentrations while being inert to other solution constituents which are not target contaminants and may be present in much higher concentrations. Examples of target contaminants include: radionuclides from liquid wastes and process solutions at nuclear power plants, such as cobalt or cesium potentially present in nuclear power plant effluents, plutonium or other alpha emitters, and other specific non-radioactive contaminants. Other radionuclides that may be targeted for selective removal include antimony-124 and -125, present in certain nuclear power plant liquid waste streams, and technetium-99, created by nuclear fuel reprocessing. The ion exchange function is selected to be inert to other non-radioactive and/or non-hazardous constituents such as sodium which may be present in much greater concentrations than the target contaminant ions. If more than one contaminant is present, a combination of different magnetic particles can be used together to decontaminate the solution.

The ability of the ion exchange function to properly absorb target ions while avoiding the absorption of non-target ions is known as "selectivity." An ion exchange function which has a high selectivity absorbs primarily target ions while being inert to non-target ions. In contrast, low selectivity ion exchange functions absorb both target and non-target ions which are similar in size. Higher selectivity ion exchange functions are more efficient because a higher percentage of target ions are absorbed by the magnetic particles.

Selectivity is achieved either through differences in the thermodynamic free energy of binding between the ion exchange function and the contaminant ion compared with the non-hazardous constituents, or through kinetic differences in the rate of the binding reaction. Many factors influence this selectivity, such as the geometry of the ion exchange function, polarizability and cavity size.

The ion exchange function can be either reversible or irreversible. Reversible ion exchange functions allow the magnetic particle to bond to and release the target ion. More specifically, magnetic particles with reversible ion exchange functions may be added to a solution and the target ions may be absorbed. The magnetic particles may then be removed from the solution and the reversible ion exchange function can release the contaminant ions. The magnetic particles can then be reused to remove more contaminants from the solution. Irreversible ion exchange functions do not allow the target contaminant ions to be released after they have been absorbed by the magnetic particle. Because the ion exchange function does not release the target contaminant ions the magnetic particles can only be used once.

In an embodiment of the present process, the ion exchange functions of the magnetic particles have the highest possible selectivity to only absorb specific target radionuclides or other low concentration contaminant ions from a solution. When the selectivity is high the volume of waste produced by the decontamination system is minimized because the magnetic particles primarily absorb only the contaminants and other non-harmful ions are not absorbed.

In general, each magnetic particle will only have a single type of attached ion exchange function, or ligand, for absorbing a single contaminant. If multiple types of contaminants are being removed, different types of magnetic particles having the corresponding ion exchange functions are used together. Alternatively, a single type of magnetic particles having multiple ion exchange functions can be added to a solution to remove multiple types of contaminants.

In the decontamination process, the magnetic particles are mixed with the contaminated solution and the ion exchange function, or ligand, bonds with specific types of contaminant ions while being inert to other ions. The magnetic particles must come into contact with the target contaminant ions for the binding reaction to occur. The solution may be mechanically agitated to induce contact between the contaminant ions and the magnetic particles. Each ion exchange function or ligand may target one specific contaminant ion and for complete removal of this contaminant ion there must be enough magnetic particles having the ion exchange function ligands to absorb all of the contaminant ions. A single type of magnetic particle can be used if only one type of ionic contaminant is being removed. However, it is also possible to use more than one type of magnetic particle, each having a different ion exchange function to simultaneously remove two or more types of contaminant ions.

The contaminant ions and magnetic particles are removed from the solution by magnetic filtration after the contaminant ions are absorbed by the magnetic particle. The magnetic filtration may require passing the solution through a magnetic filter having a high tesla magnet surrounding a mesh or powder filter element. When the filter is full, a cleaning process is performed to release the trapped magnetic particles and the absorbed contaminant ions. The magnetic field of the magnetic filter is turned off and the particles are easily be flushed out of the filter, such as by backwashing. The magnetic particles and absorbed contaminants may be disposed or alternatively the magnetic species, or core, may be separated from the magnetic particles and reused.

The decontamination process may be performed in a pipeline which transports the contaminated solution. The magnetic particles may be added to the pipeline and mixed with the contaminated solution. As the solution flows through the pipeline, the target contaminant ions selectively bond to the magnetic particles. The solution then flows through a magnetic filter which traps the magnetic particles and contaminant ions. The rest of the solution may exit the magnetic filter in a decontaminated state.

We have previously shown that small magnetic nanoparticles called "ferritins" (a naturally occurring protein having about 10 nm diameter containing a magnetic core) could be functionalized with a small, relatively selective ion exchange function such as DTPA to remove contaminants from solution. Additional magnetic nanoparticles are now available which are based on a variety of substrates other than proteins, particularly silica based substances. These new nanoparticles have not been previously functionalised to produce a selective magnetic ion exchange material, due to the reasons described below. Magnetic particles suitable for use in the subject process may have particle sizes less than or equal to about one micron, and in certain embodiments, in the range of about 5 nm to about 500 nm.

Most highly selective ion exchange functions tend to be rather large molecules, and are relatively hydrophobic. This distinguishes them from smaller, simpler, less selective functions such as DTPA. DTPA is moderately selective, being able to select, for example, between cesium and strontium. For the magnetic molecule separation process to be commercially useful, the functionalized magnetic particle must be properly selective, being coupled to larger ion exchange functional moieties. The principal problem, which is typically common to all fully selective functions (including but not limited to calixarenes and others), is that there is a significant hindrance in the coupling process between the hydrophilic nanoparticle and the large and rather hydrophobic ion exchange function. Standard coupling reactions fail to provide a product with sufficient yield to be commercially useful.

We have now demonstrated the use of calixarenes as a selective chelating function to attach to the ferritin to make the magnetic molecule. These calixarene functions are particularly useful, because by making variants of the basic structure it is possible to produce a family of functions, each of which is selective for different radionuclides. The attachment mechanism could be the same in each case, thereby allowing a family of selective particles to be produced by a single common methodology. The identification and selection of particular calixarene functions for particular contaminants is known, as are types of selective macromolecules other than calixarenes.

In one embodiment, the subject coupling mechanism has been used to produce a cesium-selective calixarene attached to a ferritin nanoparticle in good yield. The same mechanism may be used for any hydrophilic nanoparticle and any sterically hindered hydrophobic selective ion exchange function. The subject coupling mechanism comprises the selection of a particular sequence of chemical coupling reactions to fix a highly selective chelating macromolecular function onto the magnetic nanoparticle.

Ferritin is merely an example of the type of nanoparticle for which the coupling mechanism can be used. The mechanism can also be used for silica based nanoparticles, among others.

In the present process, a large chelating molecule, designed for selective capture of a particular contaminant species (such as a radioactive nuclide), may be attached to a magnetic nanoparticle with amine functional groups by means of formation of an amide bond to create a functionalized magnetic particle molecule. The carboxylic acid function on the chelating molecule is activated by formation of an acyl fluoride, in certain embodiments typically (though not exclusively) using diethylaminosulphure trifluoride (hereinafter "DAST") as the fluorinating agent. The resulting magnetic species can be used to remove contaminants from solution by the methods described in our U.S. Pat. No. 6,972,095, which is incorporated by reference herein as if fully written out below. We have found that this method of forming an amide linkage is effective at overcoming the solubility differences between large (normally hydrophobic) selective chelating molecules and hydrophilic magnetic species. The use of this coupling method therefore produces a functionalized magnetic particle or molecule having a practically useful number of chelating functions attached to its surface.

In contrast, we have found that the majority of commonly used methods of forming amide linkages fail to produce a magnetic particle or molecule with a workable number of chelating functionalities.

The present process enables high selectivity of removal of radionuclides and other low concentration contaminants from solution. This enables volumes of waste to be minimized. A chelating function with high selectivity for the target contaminant is chosen to couple to the magnetic nanoparticle to create the final functionalised magnetic molecule or particle. In certain embodiments, calixarenes are particularly suitable for this purpose.

Besides cesium, modified calixarenes may selectively chelate Am, Pu, Ra, Sr, Tc and U, among other actinides and lanthanides. Examples include, but are not limited to, calix[4]arenes and caliix[6]arenes having alkyl, alkoxy, aryl, amide, ester, carboxylic acid and other ligand groups. U.S. Pat. No. 6,630,114, which is incorporated herein by reference as if fully written out below, discloses various calixarenes having phosphinoxide-acetamide substituents bearing alkyl, aryl or alkoxy groups that may be used to extract such species from aqueous solution.

Figure 1:
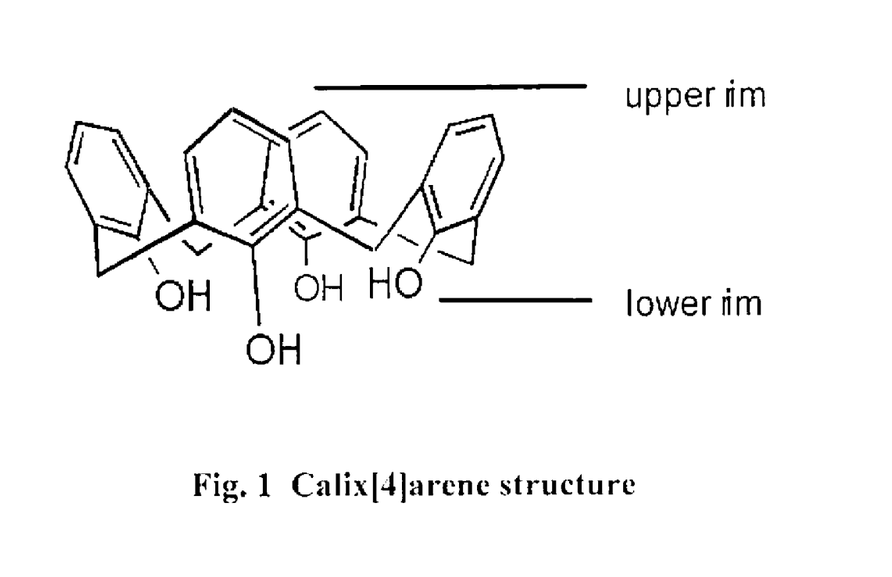
FIG. 1 illustrates the Calix[4]arene structure.

The calix[4]arenes were selected for modification for coupling to the magnetic nanoparticles due to ease of preparation and functionalization. FIG. 1 illustrates the calix[4]arene structure.

Figure 2:
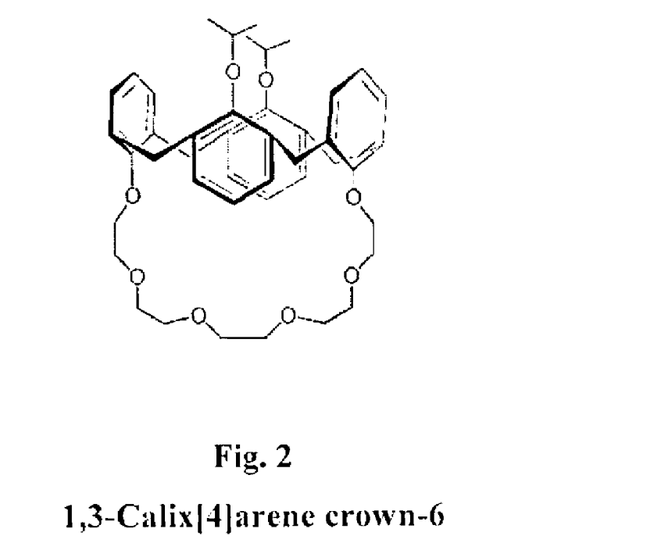
FIG. 2 illustrates the 1,3-Calix[4]arene crown-6 structure.
Figure 3:
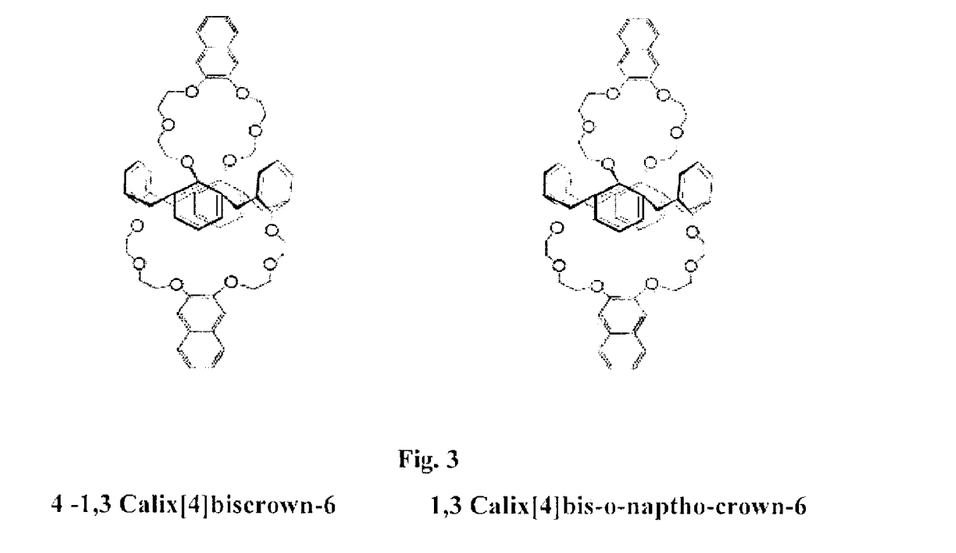
FIG. 3 illustrates the 4-1,3 Calix[4]biscrown-6 and 1,3 Calix[4]bis-o-naptho-crown-6 structures.

For cesium chelation the calix[4]arene was modified by the addition of a crown ether bridge as shown in FIG. 2. The form of the crown contributes to the selectivity of the calixarene molecule. For example, the 1,3-Calix[4]arene crown-5 is selective for potassium over cesium, whereas the crown-6 provides high selectivity for cesium over potassium. The crown-6 form can be further enhanced by the use of two crowns (bis-crown-6) and substitution within the crown, as shown in FIG. 3.

It is considered that the additional electron donation from the naptho groups allows an enhanced stabilization of the cation charge. Other crowns may be synthesized using aromatic groups at the three positions furthest from the calixarene ring. It is also considered that with the 1,3 alternate calixarene structure, the pi-electrons from the calixarene phenol rings interact with the metal cation to assist stabilization. The 1,3 Calix[4]bis crown-6 structure was chosen for the purpose of demonstrating selection between cesium and strontium.

Figure 4:
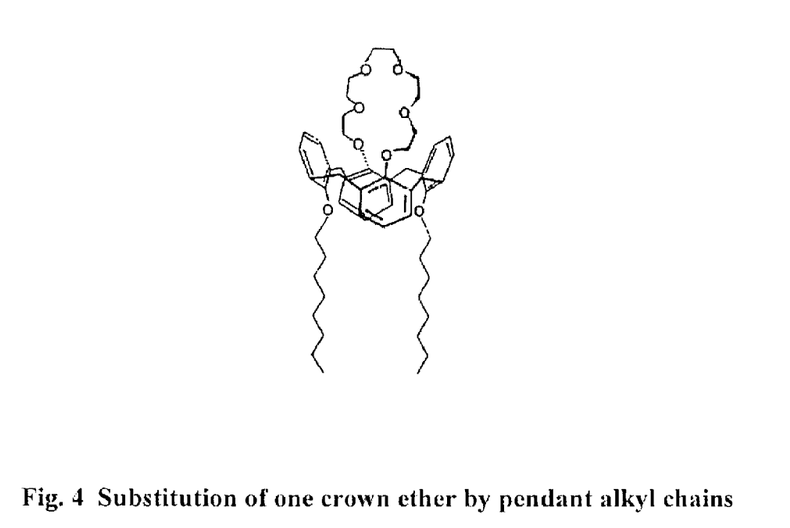
FIG. 4 illustrates the substitution of one calixarene crown ether by pendant alkyl chains.

In certain embodiments, to assist in the attachment of the calixarene molecule to the magnetic nanoparticle, one of the crowns may be replaced with two pendant alkyl chains of between seven and eleven units long as shown in FIG. 4. Such calixarenes have been attached to particle surfaces and have continued to exhibit selectivity for cesium.

The calixarene molecule is useful as a basic unit from which to build selective chelation forms. Various modified calixarenes have shown selectivity for transition metals, lead, mercury and cadmium, lanthanides, actinides, alkali and alkaline metals. The use of the present coupling process for attachment of the calixarene to the magnetic particle, such as ferritin, increases the ion selective options by substituting in the appropriate modified calixarene.

Figure 5:
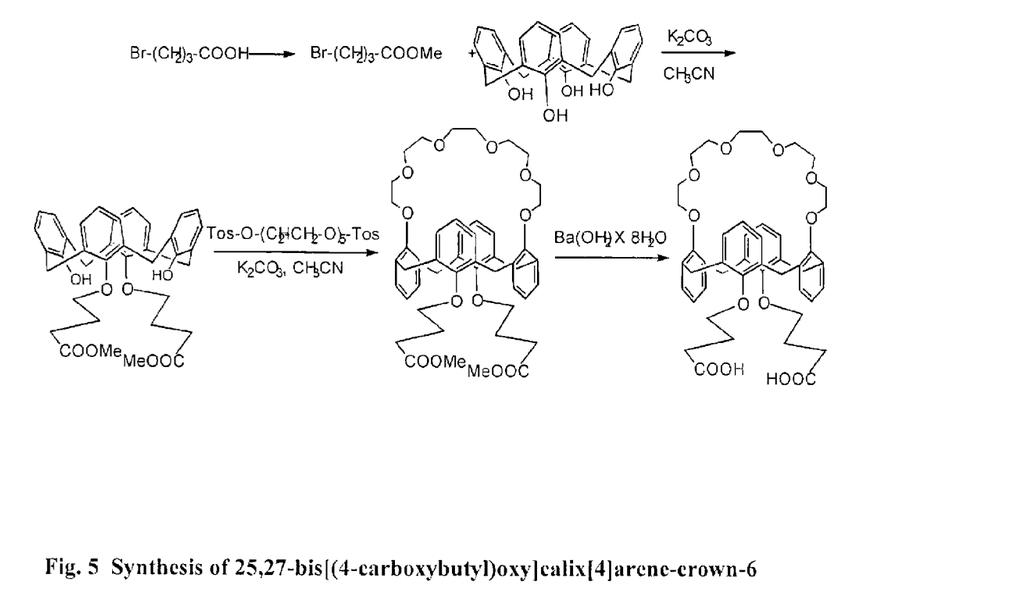
FIG. 5 illustrates the synthesis of 25,27-bis[(4-carboxybutyl)oxy]calix[4]arene-crown-6.

A cesium specific chelating agent 25,27-bis[(4-carboxybutyl)oxy]calix[4]arene-crown-6 (calixcrown-6) was synthesized according to the synthetic route used by Nechifor et al., as illustrated in FIG. 5, in order to demonstrate specific separations.

The ability of the synthesized calixcrown-6 to separate $Cs^+$ was assessed by proton NMR and a solvent extraction method. First, NMR of the freshly synthesized calixcrown-6 was taken in deuterated chloroform. To this solution, cesium picrate was added in 1:1 molar ratio. The solution was left for half an hour before another NMR was taken. The two NMRs were compared. For the solvent extraction, the synthesized calixcrown-6 was dissolved in distilled ethyl acetate. A known amount of radioactive $Cs^+$ and cesium picrate was dissolved in deionised water. The two solutions were mixed for half an hour. After mixing, 0.5 ml was extracted from each of the aqueous and organic layers, and the radioactive cesium was counted in a gamma well counter.

The present process couples selective chelating agents to a wide range of available magnetic nanoparticles. Suitable magnetic nanoparticles include those magnetic particles with a surface function of OH, COOH or $NH_2$. Small particle size results in achieving good capacity for contaminants since the attachment of the chelating agent and the ion complexation takes place on the particle surface only. If there is good capacity for contaminants it is not necessary to make the complexation or chelation reaction reversible, which in turn means that there is a wider possible choice of possible chelators, resulting in greater selectivity.

Figure 6:
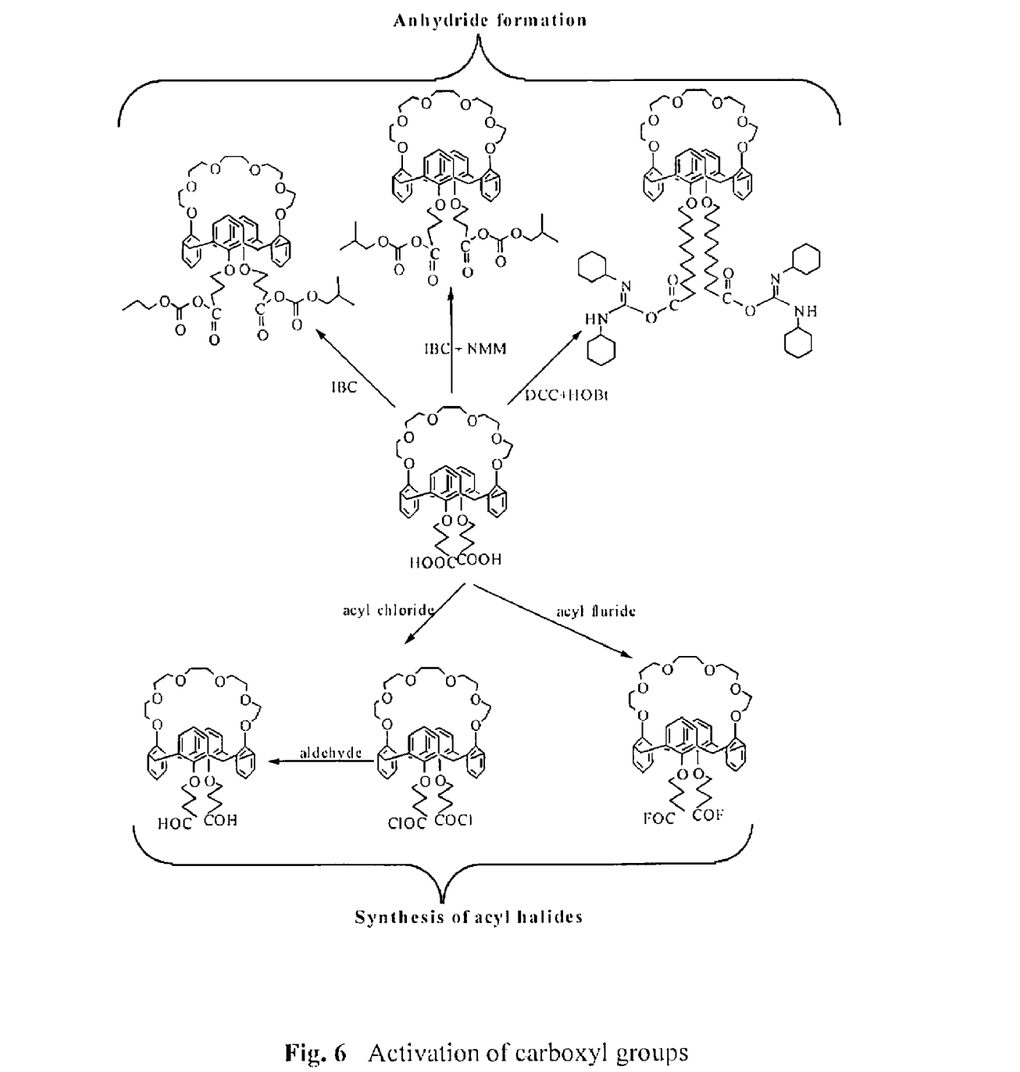
FIG. 6 illustrates the activation of carboxylic acid groups.

In general, the amine groups of macromolecules are often the targeted functional groups for the attachment of specific chelating agents through the formation of amide bonds. Amide bond formation may be accomplished by the reaction of amines with activated carboxylic acids. The activation of carboxyl groups may be achieved in many different ways, including formation of mixed anhydrides and acyl halides as illustrated in FIG. 6.

Mixed anhydride is formed by reacting the carboxylic acid with a second much cheaper carboxylic moiety. In certain embodiments, a reagent to produce mixed anhydrides is isobutylchloroformate (IBC), a cheap and readily available reagent, which alone, or together with N-methylmorpholine (NMM) as base, may be used for amide bond formation. In other embodiments, mixed anhydride may be produced using carbodiimides as activating agents. Representative carbodiimides include, but are mot limited to dicyclohexyl carbodiimide (DCC), diisopropyl carbodiimide (DIC) and 1-ethyl-3-(3'-dimethylaminopropyl)carbodiimide hydrochloride (EDAC). However, using carbodiimide as coupling agent alone can very often cause formation of an undesirable N-urea side-product. This side reaction can be reduced by either lowering the temperature close to 0° C. or by the addition of certain nucleophiles that can form an intermediate which is less reactive than the one formed with DCC, but still reactive enough to form an amide bond. A representative, but not limiting nucleophile for this purpose is hydroxybenzotriazolate (HOBt).

Other methods useful for the activation of carboxylic acids include the synthesis of acyl halides including acyl chlorides and acyl fluorides. Acyl chlorides can be produced using acyl chloride forming chloride compounds including but not limited to thionyl chloride, oxalyl chloride (($COCl_2$)) or phosphorus trichloride ($PCl_3$), among others. They react with amines in a dry solvent in the presence of a base to trap the formed hydrochloric acid. However, acyl chlorides are used less often in amide bond formation due to the danger of hydrolysis and other possible side reactions.

The unwanted side reactions can be avoided by using acyl fluorides as active intermediates, as they are less moisture sensitive and more reactive towards amines. In one embodiment, the fluorinating agent cyanuric fluoride is used, although due to the formation of insoluble cyanuric acid during workup, other fluorinating agents have been developed including N,N-tetramethylfluoroformamidinium hexafluorophosphate (TFFH) and diethylaminosulphure trifluoride (DAST).

Other available strategies for the activation of carboxyl groups and the subsequent amide bond formation were screened carefully and those selected were tested for the activation of the synthesised chelating agents in order to attach them to ferritin.

One attempt to modify the synthesised calixarene was using IBC. Although NMR and IR spectra confirmed the successful preparation of the mixed anhydride, its attachment to magnetoferritin was not successful. It is theorized that the anhydride was too acidic before it could react with the amine groups of the ferritin, which prevented amide bond formation.

A further attempt to modify the synthesised calixarene was the formation of mixed anhydride using IBC with N-methylmorpholine (NMM) and its attachment to ferritin. The biggest difficulty of following the experimental route found in the literature was conducting the reaction at −10° C. because both aqueous and organic phase froze at this temperature. The attachment was also attempted just above 0° C. Results indicated that the attachment was not successful, as higher temperatures (around 0° C.) do not support anhydride formation.

Two other activation methods were attempted to increase the number of attached chelating agents. These methods were based on the synthesis of acyl halides. First, thionyl chloride was used as a chlorinating agent for the synthesis of acyl chloride and IR spectra indicated that it was successful. However, acyl chlorides are extremely reactive and they hydrolyse instantly in the presence of even minute amount water. Therefore it was decided to convert the acyl chloride to aldehyde that is less reactive than acyl chlorides but reactive enough for the attachment to the amine group through the formation of imine bonds. Aldehydes can be synthesized by reacting acyl halides with hydrides but, hydrides are very reactive to stop at the aldehyde stage and can continue the reaction towards the formation of primary alcohols. To stop the reaction at the formation of aldehyde the syntheses were conducted at very low temperatures (−10, −60 and −70° C.) using precise amounts of hydride. However, despite every effort, IR spectra and color test of the products indicated that the conversion of the acyl chloride proceeded to the formation of primary alcohols.

Figure 7:
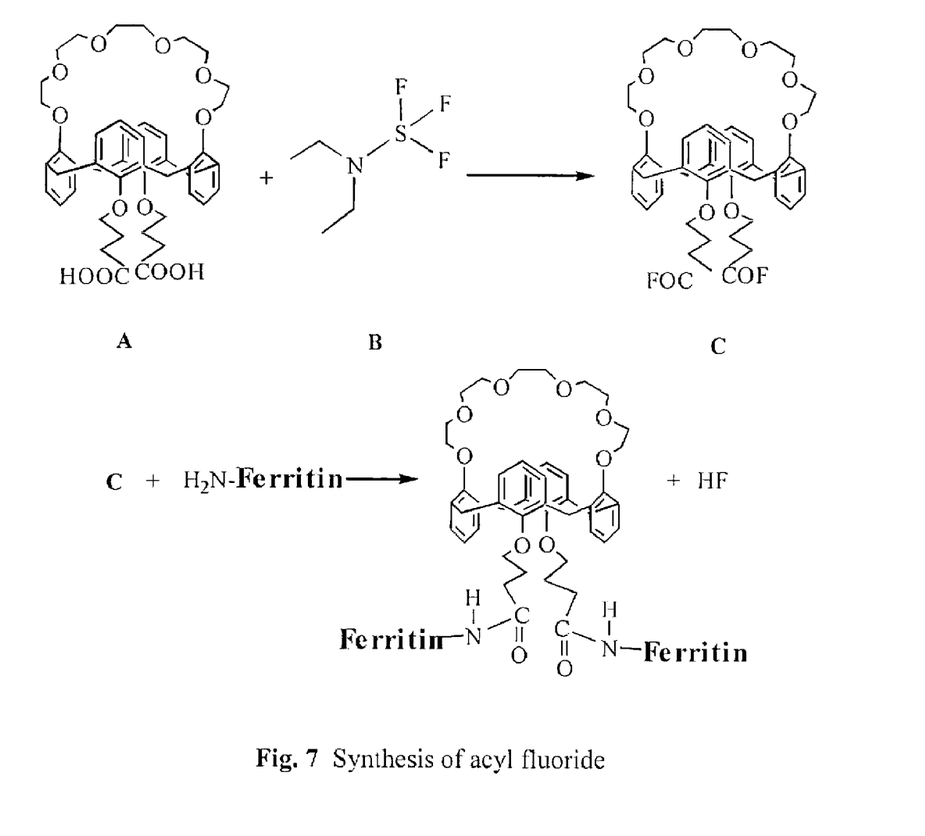
FIG. 7 illustrates the synthesis of acyl fluoride.

The method of using acyl fluorides as active intermediates for amide bond formation was then attempted (FIG. 7). Acyl fluorides were better suited active intermediates because they were less moisture sensitive and more reactive towards amines than acyl chlorides. The carboxyl groups of the calixarene were activated by the synthesis of acyl fluoride using DAST as fluorinating agent. IR spectrum analysis indicated the successful preparation of the fluoride intermediate. To reduce the possibility of hydrolysis, the fluoride was mixed with the ferritin solution immediately after preparation. The attachment was confirmed by using the produced ferritin-calixarene molecule for cesium separation. Results indicated that approximately 500 calixarene groups were attached successfully to a ferritin molecule and the produced moiety was able to separate cesium ions from solution.

EXAMPLES A

Attachment of the Chelating Agents to Magnetoferritin and Separation of Cesium Ions from Solution A batch of magnetoferritin was obtained from Nanomagnetics (Bristol, England). The magnetoferritin solution contained the fleshly made, unseparated particles in 2 mg/ml concentration.

As shown in FIG. 7, 25,27-bis[(4-carboxybutyl)oxy]calix[4]arene-crown-6 [A] (0.1 g, $1.25 \times 10^{-4}$ mol) was dissolved in $CH_2Cl_2$ (10 ml) and DAST [B] (48 mg, $3 \times 10^{-4}$ mol) was added. After 1 hour mixing the progress was checked by thin layer chromatography (TLC) using ethyl acetate as solvent. The mixture was poured in ice cold deionised water, shaken and the organic phase was separated and dried over anhydrous sodium sulphate. The drying agent was filtered, and the solvent was evaporated. The synthesised acyl fluoride product [C] was placed under vacuum for an additional 30 minutes until complete dryness and analysed by NMR and IR spectroscopy.

The synthesised acyl fluoride was attached to magnetoferritin as follows: Magnetoferritin solution (5.5 ml containing 11 mg of magnetoferritin) was added to sodium bicarbonate solution (0.1 mol/dm$^3$, 14.5 ml) and the acyl fluoride 25,27-bis[(4-carboxybutyl)oxy]calyx[4]arene-crown-6 fluoride (34.1 mg, $4.1 \times 10^{-5}$ mol) was dissolved in dimethylsulfoxide (DMSO) (1 ml). The dissolved fluoride (0.5 ml) was mixed with the prepared magnetoferritin solution (20 ml) and left at room temperature overnight. A control solution was also prepared by mixing the magnetoferritin solution (20 ml) with DMSO (0.5 ml) and leaving it at room temperature overnight.

Next day the sample and control solutions were filtered and dialyzed against water for 24 hours. The external water was changed four times during this time period.

The ability of the produced molecule to separate cesium ions from solutions was determined by radioactive measurement. Prior to tests a radioactive secondary stock solution (500 ml) was prepared as follows: radioactive cesium solution (supplied by Platom Radioisotope Centre in Poland containing 67.99 MBq/ml radioactivity) was diluted to a concentration which contained 370 Bq/ml radioactivity.

The prepared magnetoferritin-25,27-bis[(4-carboxybutyl)oxy]calix[4]arene-crown-6 solution (1 ml) was added to the radioactive cesium solution (2 ml) and shaken for 1 hour. The control solution was also treated the same way.

Separation equipment was constructed which consisted of a short open top plastic column filled with iron filing and two magnets. The sample (1 ml) was loaded into the column with the magnets in place, washed with water and the effluent was collected (10 ml). After the third fraction the magnets were removed and further three fractions were collected. A radioactivity in each fraction was measured using a 1282 Compu-Count universal gamma counter.

Results

The calixarene was attached to magnetoferritin through formation of acyl fluoride as active intermediate and the ability of the produced magnetoferritin-calixarene molecule was used to sequester radioactive cesium from solution. The magnetoferritin-calixarene molecules after cesium separation were removed by magnetic separation and the amount of radioactive cesium was measured. Two control solutions were also tested similarly: magnetoferritin without calixarene and deionised water. Table 1 lists the detected counts per minutes in the sample and control solutions.

TABLE 1

Counts per minute in the collected fractions

| | | Counts per minute | | |
|---|---|---|---|---|
| | | Sample | Blank ferritin | Blank water |
| Magnets on | 1 | 108 | 103 | 90 |
| | 2 | 126 | 124 | 192 |
| | 3 | 188 | 686* | 687 |
| Magnets off | 1 | 915 | 145 | 180 |
| | 2 | 194 | 125 | 125 |
| | 3 | 179 | 99 | 123 |

Using the results of the gamma emission of the blank (water) and the secondary cesium standard solution, it was possible to calculate the activity in the different fractions and the results are shown in Table 2.

TABLE 2

Activity in the collected fractions

| | | Activity (Bq/ml) | | |
|---|---|---|---|---|
| | | Blank water | Blank magnetoferritin | Sample |
| Magnets on | 1 | 0 | 0 | 0 |
| | 2 | 6.80 | 0 | 0 |
| | 3 | 48 | 47.9 | 6.5 |
| Magnets off | 1 | 5.8 | 2.9 | 66.9 |
| | 2 | 0 | 0 | 7 |
| | 3 | 0 | 0 | 5.7 |

The activity of the deionised water was only tested to obtain information on the time needed for the radioactive cesium to leave the column. Results showed that most of the radioactivity left the system in the third fraction with the magnetic field on. Similar trend was observed when the control magnetoferritin was tested. Although the effluents collected with the magnetic field on were colorless, indicating the absence of magnetoferitin, the gamma emission of the third fraction increased significantly. It suggested that radioactive cesium was not associated with the control magnetoferritin.

When the actual sample mixture was tested the effluents collected with the magnets in place were also colorless and no increase of gamma emission was detected in any of the fractions. However, a few seconds after the magnets were removed dark brown solution appeared and the gamma emission increased significantly. These results showed that radioactivity was associated with the magnetic molecule indicating that calixarene was attached to magnetoferritin successfully without losing its ability to separate cesium ions from solutions.

EXAMPLES B

Attachment of the Chelating Agents to Other Magnetic Particles and Separation of Cesium Ions from Solution Four other nanoparticles were tested supplied by Chemicell and Kisker, Germany.

Chemicell:
1. SIMAG-AMINO: silica based particles in 50 mgml$^{-1}$ concentration and particle size of 250 nm.
2. FluidMAG-Q: magnetite core with synthetic polymer coating, 28 mgml$^{-1}$ concentration and particle size of 50 nm.

Kisker:
1. Superparamagnetic silica particles, 25 mgml$^{-1}$ concentration with particle size of 500 nm.
2. Dextran based magnetic nanoparticles: 5 mgml$^{-1}$ concentration with particle size of 20 nm.

All samples had surface amino functional groups so that the prepared calixarene derivative was attached through formation of acyl fluoride as active intermediate. The solutions were diluted to achieve the same concentration as using magnetoferritin (11 mg sample in 20.5 ml of solution) and calix[4]arene fluoride was synthesised and attached to the samples as described above.

The prepared solution containing the functionalized magnetic particles (1 ml) was added to the radioactive cesium solution (2 ml) and shaken for 1 hour. The control solution was also treated the same way.

A similar but smaller separation equipment was constructed by filling a 2.5 ml syringe with 0.5 ml of iron filing and placing it next to only one magnet. The sample (1 ml) was loaded into the column with the magnets in place, washed with water (1 ml) twice and the effluents were collected. The magnets were removed and the filter was washed again. A radioactivity in each fraction was measured using a 1282 CompuCount universal gamma counter.

Results

Chemicell Samples

The Chemicell samples were unstable, they aggregated and sedimented to the bottom of the vial after attachment of the chelating agents. Although they were re-dispersed using vortex but they aggregated again within 24 hours. A column was put together using steel powder as filter and magnets provided the magnetic field. The sample was loaded onto the column with the magnets on and washed with water. No color was visible indicating that the sample stayed on the filter. The magnets were removed and the column was washed with water but still the sample was still not visible. After several attempt the column was disassembled and the still powder was washed with water. The solution on top of the steel powder was colored indicating the presence of the magnetic particles.

Another test was performed by loading the samples onto the column without magnetic field. The particles stayed on the column indicating that steel powder was not suitable as a filter.

The next column was put together using steel wool. The sample left the column instantly without magnetic field indicating that wool was a better filter. However, when the sample was loaded into the column with the magnets in place, the particles could not be removed even after the magnets were removed. The particles must have aggregated in the column forming large clusters that could not fit through the pores of the filter.

Kisker Samples

Both samples seemed to be more stable after addition of the chelating agents. The samples left the column after loading them onto a steel powder filter without a magnetic field. They were loaded onto the column again with the magnets in place and they seemed to leave the column after the magnetic field was removed therefore they were taken for radioactive measurements.

1. Silica Based Particles

The effluents collected while the magnet in place were colorless indicating that the particles stayed on the column. At the same time the radioactivity of the effluents increased suggesting that the radioactive cesium was not associated with the particles.

2. Dextran Based Particles

When the control (dextran without chelating agents) was loaded into the column, the radioactivity of the effluents increased significantly even with the magnetic field on suggesting that the radioactive cesium was not associated with the dextran.

The effluents collected with the magnetic field on were also colorless and the radioactivity was close to background levels. When the magnet was removed and the column washed, no particles left the column and the radioactivity did not increase. When the filter was removed and tested, the dextran particles were visible and most of the radioactivity was accounted for. These results showed that radioactivity was associated with the coated particles, demonstrating that the magnetic molecules were functionalized successfully and they were able to separate cesium ions from aqueous solution. The result also suggested that these particles are very magnetic.

EXAMPLES C

Separation of Cesium, Strontium

Ferritin-calixarene molecule was tested to separate cesium ions from strontium ions from solutions containing equal amounts of ions. Results showed that ferritin-calixarene complexed approximately twice as much cesium as strontium.

In another embodiment, the magnetic particles coupled to selectively chelating ion exchange functionality containing moieties prepared by the subject process, may be used to remove radioactive species from radioactive oil scale waste in water, pre-treated according to methods disclosed in WO2002/013202, incorporated herein by reference.

As an example, the volume reduction of radioactive oil scale waste may be achieved by a process which comprises: a) providing a de-oiled solid scale material; b) subjecting the solid scale material to a solvent such as an alkaline aqueous solution, optionally containing a chelating agent, having the ability of dissolving barium and strontium sulphates together with associated radioactive species, such as radium, therefrom so as to form a scale solution; c) separating any undissolved solid from the scale solution; d) contacting the scale solution with anion exchange material so as to remove sulphate ion therefrom; e) contacting the resulting sulphate-ion depleted solution with magnetic particles coupled to selectively chelating ion exchange functionality containing moieties prepared by the subject process so as to accomplish separation of radium and optionally other radioactive species from barium and strontium by allowing the chelating functionality coupled magnetic particles to selectively bind one or more of radium and other radioactive species: and, f) extracting the chelating functionality coupled magnetic particles and bound species from the solution by magnetic filtration.

Although the invention has been described in detail through the above detailed description and the preceding examples, these examples are for the purpose of illustration only and it is understood that variations and modifications can be made by one skilled in the art without departing from the spirit and the scope of the invention. It should be understood that the embodiments described above are not only in the alternative, but can be combined.

The invention claimed is:

1. A process for selectively removing contaminant ions from a solution comprising:
    a) contacting the solution with magnetic particles coupled to selectively chelating ion exchange functionality containing moieties prepared by:
        i) activating carboxyl groups on the selectively chelating ion exchange functionality containing moieties by the formation of an acyl fluoride, and
        ii) reacting the acyl fluoride with the magnetic particles, the magnetic particles having a particle size of less than 10 microns;
    b) allowing the chelating functionality coupled magnetic particles to selectively bind one or more of the contaminant ions: and,
    c) extracting the chelating functionality coupled magnetic particles and contaminant ions from the solution by magnetic filtration.

2. The process for selectively removing contaminant ions from the solution according to claim 1 wherein the magnetic particles contain a surface function of at least one of OH, COOH or $NH_2$.

3. The process for selectively removing contaminant ions from the solution according to claim 1 wherein said reacting the acyl fluoride with the magnetic particles proceeds via the formation of an amide bond.

4. The process for selectively removing contaminant ions from the solution according to claim 1 wherein the magnetic particles have a particle size less than or equal to about 1 micron, optionally in the range of about 5 nanometers to about 500 nanometers.

5. The process for selectively removing contaminant ions from the solution according to claim 1 wherein the magnetic particles comprise a magnetoferritin molecule.

6. The process for selectively removing contaminant ions from the solution according to claim 1 wherein the ion exchange functionality comprises a non-polymeric, hydrophobic macromolecule.

7. The process for selectively removing contaminant ions from the solution according to claim 1 wherein the ion exchange functionality comprises a calixarene.

8. The process for selectively removing contaminant ions from the solution according to claim 7 wherein the calixarene comprises at least one of alkyl, alkoxy, amide, aryl, ester, or carboxylic acid chelating ligands.

9. The process for selectively removing contaminant ions from the solution according to claim 7 wherein carboxyl groups of the calixarene are activated by the synthesis of acyl fluoride using a fluorinating agent.

10. The process for selectively removing contaminant ions from the solution according to claim 9 wherein the fluorinating agent comprises at least one of diethylaminosulphure trifluoride (DAST) or N,N-tetramethylfluoroformamidium hexafluorophosphate (TFFH).

11. The process for selectively removing contaminant ions from the solution according to claim 9 wherein the synthesised acyl fluoride is attached to magnetoferritin to form a ferritin-calixarene molecule having multiple calixarene groups.

12. The process for selectively removing contaminant ions from the solution according to claim 1 wherein the ion exchange functionality comprises a calix[4]arene.

13. The process for selectively removing contaminant ions from the solution according to claim 1 wherein the ion exchange functionality comprises:
25,27-bis[(4-carboxybutyl)oxy]calix[4]arene-crown-6.

14. The process for selectively removing contaminant ions from the solution according to claim 1 wherein the contaminant ions comprise cesium.

15. The process for selectively removing contaminant ions from the solution according to claim 1 wherein the contaminant ions comprise at least one of Am, Co, Pu, Ra, Sr, Tc or U.

16. The process for selectively removing contaminant ions from the solution according to claim 1 wherein the contaminant ions comprise at least one radioactive actinide or lanthanide.

17. The process for selectively removing contaminant ions from the solution according to claim 1 wherein the magnetic filtration comprises using a high tesla magnet and a filter element.

18. The process for selectively removing contaminant ions from the solution according to claim 1 wherein the magnetic filtration comprises using a magnetic filter to capture the chelating functionality coupled magnetic particles and bound contaminant ions, and further comprising removing the chelating functionality coupled magnetic particles and bound contaminant ions from the magnetic filter by backwashing the magnetic filter.

19. The process for selectively removing contaminant ions from the solution according to claim 1 wherein the solution is a de-oiled oil scale solution containing barium, strontium and a radioactive contaminant ion, optionally radium, from which undissolved solid and sulphate ion have been removed, wherein the radioactive contaminant ion is separated from barium and strontium.

\* \* \* \* \*